United States Patent
Ristock et al.

(10) Patent No.: US 10,440,185 B2
(45) Date of Patent: Oct. 8, 2019

(54) SYSTEM AND METHOD FOR CONTACT CENTER SHARED ECONOMY

(71) Applicant: Genesys Telecommunications Laboratories, Inc., Daly City, CA (US)

(72) Inventors: Herbert Willi Artur Ristock, Walnut Creek, CA (US); Merijn te Booij, Burlingame, CA (US); Vladimir Mezhibovsky, San Francisco, CA (US); David Anderson, Durham, NC (US); Yevgeniy Petrovykh, Walnut Creek, CA (US)

(*) Notice: Subject to any disclaimer, the term of this patent is extended or adjusted under 35 U.S.C. 154(b) by 0 days.

(21) Appl. No.: 14/795,563

(22) Filed: Jul. 9, 2015

(65) Prior Publication Data
US 2017/0013132 A1  Jan. 12, 2017

(51) Int. Cl.
| H04M 3/00 | (2006.01) |
| H04M 3/523 | (2006.01) |
| G06Q 30/00 | (2012.01) |
| G06Q 30/06 | (2012.01) |

(52) U.S. Cl.
CPC .......... *H04M 3/5235* (2013.01); *G06Q 30/01* (2013.01); *G06Q 30/0617* (2013.01)

(58) Field of Classification Search
CPC .. H04M 3/5191; H04M 3/5233; H04M 3/523; H04M 3/5232; H04M 3/5183; H04M 3/51; H04M 3/5175; G06Q 30/0202; G06Q 30/0201
USPC .......... 379/265.01–265.02, 266.02; 705/7.31
See application file for complete search history.

(56) References Cited

U.S. PATENT DOCUMENTS

| 6,070,142 | A | 5/2000 | McDonough et al. |
| 6,714,642 | B2 | 3/2004 | Dhir et al. |
| 7,165,037 | B2* | 1/2007 | Lazarus ............... G06Q 30/02 705/7.31 |
| 8,830,876 | B2 | 9/2014 | Ristock et al. |
| 8,995,644 | B2 | 3/2015 | Ristock et al. |
| 2002/0133392 | A1* | 9/2002 | Angel ............... G06F 17/3089 705/7.39 |
| 2007/0288349 | A1* | 12/2007 | Chang .................. G06Q 40/04 705/37 |
| 2008/0247529 | A1 | 10/2008 | Barton et al. |
| 2011/0002453 | A1 | 1/2011 | Finkle |
| 2012/0030232 | A1* | 2/2012 | John .................... G06Q 10/00 707/769 |
| 2014/0310077 | A1* | 10/2014 | Narasimha ........... G06Q 50/01 705/14.3 |

(Continued)

FOREIGN PATENT DOCUMENTS

WO  2014145149 A1  9/2014

OTHER PUBLICATIONS

"Shareconomy" CeBIT 2013.
(Continued)

*Primary Examiner* — Rasha S Al Aubaidi

(57) ABSTRACT

A system includes a contact center to provide an interaction between a consumer and an agent workstation of the contact center, where the consumer conducts a transaction with a provider through a third party marketplace. A database stores information about a relationship between the consumer, the provider and the marketplace. The contact center to routes the consumer to the agent workstation based on the relationship.

18 Claims, 5 Drawing Sheets

(56) References Cited

U.S. PATENT DOCUMENTS

2016/0198509 A1* 7/2016 Hayes, Jr. ........... H04W 76/023
370/329

OTHER PUBLICATIONS

"Sharing economy moves mainstream" Somerville and Kurhi, Aug. 6, 2013.
International Search Report and Written Opinion for Application No. PCT/US2016/041623, dated Oct. 12, 2016, 15 pages.

* cited by examiner

SYSTEM AND METHOD FOR CONTACT CENTER SHARED ECONOMY

BACKGROUND

Contact centers exist to handle sales, service and technical support for businesses offering products and or services to their customers and potential customers. Current communications methods in place in contact centers may focus on individual contacts and manage those contacts individually from the standpoint of incoming and proactive interaction campaigns.

BRIEF DESCRIPTION OF THE DRAWINGS

In association with the following detailed description, reference is made to the accompanying drawings, where like numerals in different figures can refer to the same element.

DETAILED DESCRIPTION

A system and method for contact centers provides operations for shared economy where contact centers, consumers, providers, and groups of individuals and other entities, can be treated. The contact center setting can apply to various relations, for example, the contact center and the consumer, the contact center and the provider, the contact center and the grouped consumer and provider, the consumer and the provider, etc. The provider can provide products, services, etc., and the contact center or the consumer can sometimes act as the provider. In some cases the consumer may be a buyer and the provider may be a seller.

Figure 1:
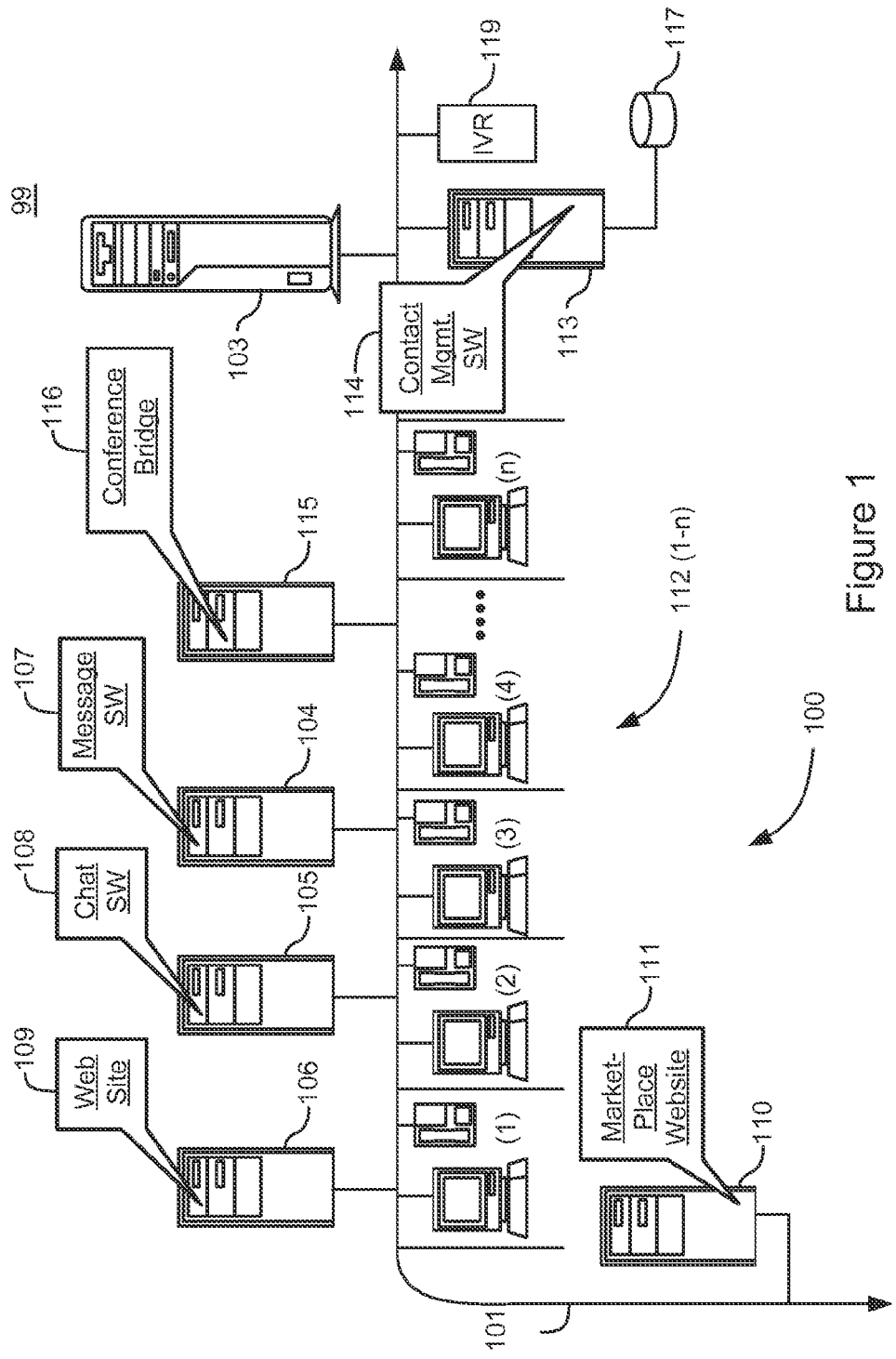
FIG. 1 is an architectural view of a data and communications network supporting association to a contact within a contact center.

FIG. 1 is an architectural view of a data and communications network 100 supporting association to a contact within a contact center 99. Commonly assigned U.S. Pat. Nos. 8,995,644 and 8,830,876 having embodiments that relate to exposing availability to contact center agents and interacting with individuals as a contact, respectively, are incorporated by reference in their entirety herein. Contacts can include consumers, providers, buyers, sellers, customers, other contact centers, marketplaces, etc. The contact center 99 may have its own business relation both to a consumer and a provider, but the relation with the provider may be closer, e.g., frequency and duration, than with the consumer. Overall business success, both for the contact center and the provider, can depend on how attractive/popular the offered marketplace experience is for the consumer and/or provider.

The data and communications network 100 includes a network backbone 101. Network backbone 101 can represent the Internet backbone including any connected sub-networks, e.g., adapted for Internet or other protocols. Backbone 101 includes the lines, equipment, and access points that make up the Internet network and connecting networks as a whole. Therefore, there may be no geographic limitations to the communication network 100.

Data and communications network 100 may be referred to as the Internet network, although logically illustrated in this example to include an Internet connected contact center local area network (LAN). The portion of backbone 101 supporting LAN-connected nodes within the contact center domain may be referred to as LAN 101. Where backbone 101 extends beyond the contact center domain, it may be referred to as Internet 101. LAN 101 supports multiple agent workstations 112 (1-n) within a contact center domain. Workstations 112 (1-n) include a LAN-connected personal computer (PC) and a LAN-connected Internet protocol (IP) telephone for conducting voice communications. In this example, data network telephony (DNT), e.g., Internet protocol network telephony (IPNT) is practiced. Analog or public switched telephony can also be practiced within the contact center domain.

LAN 101 supports a Web server 106. Web server 106 includes a non-transitory physical medium adapted to contain the data and software to enable function as a Web server that server Web pages created using any one of several markup languages and supporting protocols. Web server 106 includes a contact center website 109. Website 109 represents an Internet access point for interacting with and communicating with contact center resources including live agents operating at workstations 112 (1-n). Website 109 may be hosted by the contact center 99 or by a business entity represented by the contact center 99. A third party may also host website 109. LAN 101 supports a chat server 105. Chat server 105 includes a non-transitory physical medium adapted to contain the data and software, namely chat software (SW) 108, to enable function as a chat server. LAN 101 supports a message server 104 within the domain of the contact center 99. Message server 104 includes a non-transitory physical medium that includes the data and software, namely message software (SW) 107, to enable function as a message server. Message server 104 may be an email server or any other type of server that serves messages, notifications, or other message types.

LAN 101 supports a conference bridge server 115. Conference bridge server 115 includes a non-transitory physical medium that contains the data and software, e.g., conference bridging SW, to enable function as a conference bridge server. LAN 101 supports a router 103. Router 103 includes a non-transitory physical medium adapted to contain the data and software to enable function as a router. Router 103 may rout IP calls, messages, internal calls, and other data over LAN 103. Interactions may arrive at router 103 from external networks for destination routing within the contact center 99. The interactions may be connected to an interactive voice response (IVR) server 119, which may serve to ascertain a purpose of the caller and other information useful in further routing of the call to final connection, if further routing is needed. For example, the IVR 119 may provide a menu of option for the customer to select the issue they are calling about, e.g., by stating the problem and/or pressing a number on their mobile device. Other equipment may be included within the domain of the contact center 99 and may be supported by LAN 101, including but not limited to a voice application server, an outbound contact server, etc. The IVR 119 can also be used during outbound campaigns.

Backbone 101 supports a publicly accessible Web server 110. Web server 110 includes a non-transitory physical medium adapted to contain the data and software (SW) to enable function as a Web server. Web server 110 is hosted outside of the domain of the contact center 99. Web server 110 hosts one or more marketplace interaction websites 111. Website 111 may include websites for shared economy businesses including housing, driving, flying, lending, etc. businesses, e.g., AIRBNB, UBER, LYFT, etc., or any other site that enables shared economy interactions.

LAN 101 supports a contact management server 113. Contact management server 113 includes a non-transitory physical medium adapted to contain the data and software, namely contact management software (SW) 114, to enable function as a contact management server. Universal contact server (UCS) 113 manages individual contacts, e.g., consumers, providers and other contacts known by the contact center 99. In shared economy a filtered view of the UCS 113 can be shared with the consumer as vendor relationship management (VRM) or the provider as customer relationship management (CRM). In another context the same person can be either the consumer or the provider, or both the consumer and the provider, e.g., a re-provider.

SW 114 includes functions for managing individuals as a contact entity within the contact center 99. SW 114 includes a function for identifying individuals including identification of each member according to any existing rules and member profiles. The server 113 can interface with a database 117 that stores data on the contacts, e.g., consumers and providers, and stores interactions. The server 113 can also store data used in category systems, screening rules, services and standard responses.

Figure 2:
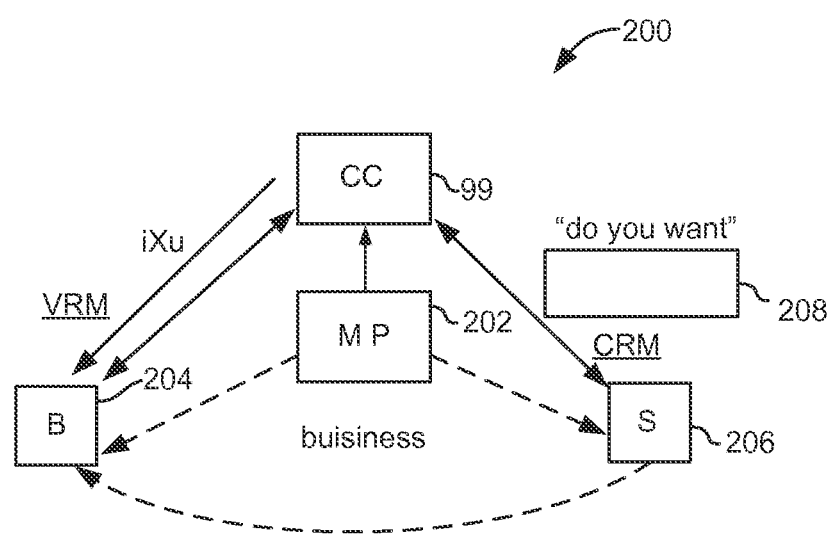
FIG. 2 is a block diagram of an example architecture for the contact center to support shared economy companies, e.g., by supporting contact center, consumer and provider interrelationships.

FIG. 2 is a block diagram of an example architecture 200 for the contact center 99 to support shared economy companies, e.g., by supporting contact center 99, consumer 204 and provider 206 interrelationships. A third-party marketplace 202 can provide a shared economy businesses, e.g., for housing, driving, flying, lending, etc. that allow a consumer 204 to rent or borrow goods or services from a provider 206, rather than the consumer 204 purchasing or owing the good. In other examples, the consumer may purchase the goods. The marketplace 202 connects the consumer 204 to the provider 206 to conduct their transactions, e.g., renting a room, getting a ride, etc.

The contact center 99 supports different use cases, for example a customer to customer relationship, e.g., AIRBNB, mediated by contact center 99, and a customer to business relationship, e.g., car sharing, where multiple customers share certain property/service. For the customer to customer relationship, one customer is usually acting as provider 206, and the other as consumer 204. As described in more detail below, the contact center 99 can provide both customer relationship management (CRM) and vendor relationship management (VRM) functions for use by provider 206 and consumer 204 respectively. The contact center 99 can charge a service fee for using the marketplace 202, typically from the provider 206. The contact center agents can help both providers 206 and consumer 204 on using the marketplace 202, and making sure that determined rules are followed. Consumers 204, providers 206 and marketplaces 202 can select among several mediation contact center services, based on a variety of criteria including popularity, a particular profile, e.g., geo-area, security, user friendliness, fees, etc. The contact center 99 can offer premium services for a fee, e.g. advanced customer and vendor relationship management (CRM/VRM).

In the customer to business relationship there can be open and closed communities. In case of an open community the membership is not strictly limited and in general anyone can join at any time, potentially after passing acceptance check, e.g. car sharing members need a driver's license and to pay membership fees. Members may be anonymous, e.g., a directory may not be exposed publicly and members are treated equally. Example cases for closed membership include timesharing of a vacation house or booking a vacation trip with minimum/maximum attendance limits. In the case of the closed community the membership is limited, and membership information may be exposed to the whole team. Voting weight may differ across different members and a representative quorum may be able to make decisions on behalf of the whole community.

The consumer 204, the provider 204 and/or the marketplace 202 can communicate with the contact center 99 via various communication mediums, including but not limited to website 111, a call, a text a chat, an email, etc. The contact center 99 can provide customer service, answer questions by the consumer 204 or the provider 206, provide statistics to the consumer 204, provider 206 or marketplace 202, etc. Supported media for contact center to consumer and contact center to provider relations are not necessarily the same as consumer to provider media. For example, the latter could be a subset of the former.

Figure 3:
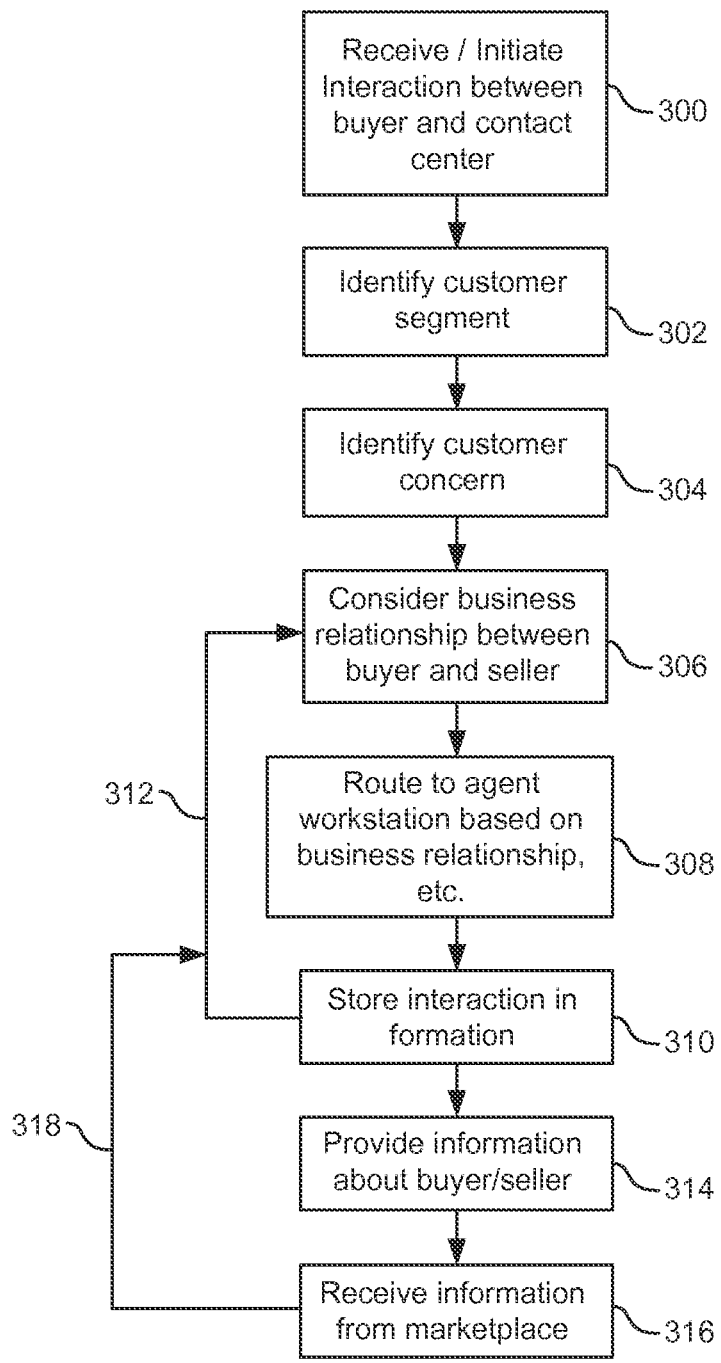
FIG. 3 is a flowchart of an example logic for the contact center to interact with the consumer and/or provider.

Referring to FIG. 2 and FIG. 3, FIG. 3 is a flowchart of an example logic for the contact center 99 to interact with the consumer 204 and/or provider 206. An interaction occurs between the contact center 99 and the consumer 204 (300). For example, the consumer 204 communicates a question to the contact center 99 about the marketplace 202, or communicates a comment that the consumer 204 is unsatisfied with a service or a product of the provider 206. Additionally or alternatively, the contact center 99 may reach out to the consumer 204, e.g., during an outbound campaign for the marketplace 202, etc. The contact center 99 can identify the customer segment (e.g., gold/silver/bronze) (302) and determine the consumer's concern (304), e.g., via the IVR 119 and/or 800 number that the consumer 204 dialed for purposes of routing the consumer 204 to an agent workstation 112 (1-n). The customer segment can be richer in the contact center 99 for shared economy compared to traditional contact centers. For example, the customer segment can apply to all relationships (contact center 99 to consumer 204, contact center 99 to provider 206, provider 206 to consumer 204, etc.), and is not necessarily the same for the various relationships. For example, a particular consumer can be designated gold for one provider, but not for another.

The contact center 99 considers a business relationship between the consumer 204 and the provider 206 for routing purposes. For example, the server 113 can access information in database 117 about the business relationship between the consumer 204 and the provider 206 and/or the contact center 99 can query the consumer 204 or the provider 206 to determine the business relationship. The contact center 99 routes the consumer 204 to an agent workstation 112 (1-n) based on the business context of consumer 204 with the provider 206, in addition to the gold/silver/bronze segment levels and/or consumer selections on IVR 119 (308). The contact center 99 can also apply the customer segment for the consumer 204 based on context. For example, renting a house qualifies the consumer 204 as a gold customer and renting an apartment qualifies the consumer 204 as a silver customer. Context related segments can also apply to providers 206.

The contact center 99 can consider routing priority if both the consumer 204 and the provider 206 for a particular transaction are waiting in the queue to be routed to an agent workstation 112 (1-n). The contact center 99 can also monitor and consider a business relation between the consumer 204 and the provider 206 when routing. For example, in some circumstances the consumer can also act as a provider, and vice versa. In interactions between the contact center 99 and the consumer 204, the consumer/provider context may be considered by the contact center 99 in routing to agent workstation 112 (1-n). The same can apply to interactions between contact center 99 and the provider 206.

The contact center 99 services the marketplace 202 by orchestrating interactions between consumers 204 and multiple providers 206. For example, the contact center 99 can orchestrate the routing of communications between the contact center 99 and consumer 204, the contact center 99 and provider 206, the consumer 204 and provider 206, etc., and how interaction is created. The contact center 99 can process multiple businesses offering combined service where each business is still operating independently, e.g., travel booking, support for iPhone, etc. In one example, if the consumer 204 is having a problem with their iPhone, the contact center 99 can check with service provider (e.g., ATT), then the manufacturer of phone hardware and software (APPLE), and then application provider for software running on the phone, e.g., application bug, to help solve the problem.

To accommodate VRM and CRM the contact center 99 can maintain a history of interactions with the consumer 204 and the provider 206 and/or multiple consumers and providers in the database 117. For example, the contact center 99 maintains a list of transactions, ranking of providers, rankings of consumers, etc. (310), which can be used for future interactions with the consumer 204 and provider 206 and/or similarly grouped consumers and providers (312). The contact center 99 can provide VRM and CRM to track histories for the consumer 204 and/or the provider 206, and provide that information to the consumer 204 and/or the provider 206 (314). For example, if the consumer 204 rents from different providers over time the contact center 99 can display a history of consumer transactions over time. Moreover, the provider 206 can contact the contact center 99, e.g., for help, information, etc. In this way, the contact center 99 can serve to ensure quality is appropriate, ratings and profiles are updated, etc. VRM and CRM can be restricted to the consumers 204 and providers 206 own business interactions, or contain aggregated information on other consumers 204 and providers 206 business operations.

The contact center 99 can also share analytics for consumers 204 and providers 206 to make informed decisions, e.g., with regard to satisfaction, an ability to meet needs within a certain time, a quality of service and/or product, a quality of the renter, etc. Based on the information the contact center 99 can display upsell capabilities on the website 111, e.g., provider provides an UBER ride to house they are renting. The contact center 99 can offer different deals to the consumer 204 depending on the consumer profile, e.g., offer lower price based on good credit, frequent consumer, etc. The contact center 99 can help the provider 206 to personalize in real-time offers for a given consumer 204, e.g. depending on the consumer's financial situation, e.g., a cheaper car rental rate for visitors from certain foreign countries, or higher rates if the consumer 204 is using a computer manufactured by APPLE. The contact center 99 can group multiple consumers renting at same time or over time virtually group consumers that entered a department. The marketplace 202 can also provide information about the relationship between the consumer 204 and the provider 206 to the contact center 99 (316), which the contact center 99 can consider in routing the consumer to an agent workstation 112 (1-n), making deals to the consumer 204, etc. (318).

Figure 4:
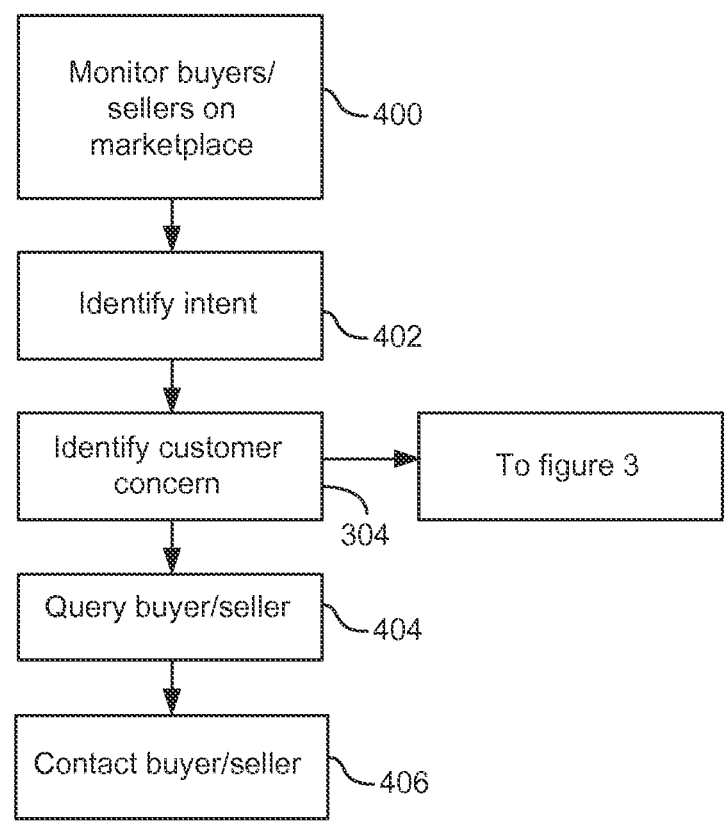
FIG. 4 is a flowchart of an example logic for the contact center to engage the consumers and providers.

FIG. 4 is a flowchart of an example logic for the contact center 99 to engage the consumers 204 and providers 206. Referring also to FIGS. 2-4, the contact center 99 can monitor what different consumers 204 and/or providers 206 are doing on the marketplace 202 (400). Depending on how the marketplace 202 is organized, the consumer 204 may be able to post questions and notes to the marketplace 202. The contact center 99 can perform intent analysis based on the questions and notes posted to the marketplace 202 (402). The notes may relate to the service or product of the provider and/or the service of the contact center 99, e.g., a complaint about a missing feature in market place. In one example, the contact center 99 can determine the intent of the consumer through machine learning and text analysis so that the contact center 99 can use the determined intent to help identify a customer concern (e.g., 304 of FIG. 3).

The consumer 204 may contact the marketplace 202 via website 111, e.g., by mobile engagement provided by the contact center 99. The contact center 99 can dynamically query the consumer 204, e.g., via a display of the device of the consumer 204, for example with a 'do you want' prompt 208 regarding whether consumer 204 would like to communicate with the provider 206, e.g., via voice or chat (404). The device can include a mobile phone, a laptop, a tablet, etc. The query can be accomplished by the contact center 99 monitoring the provider's presence and having the provider's buy-in for contact establishment. If the consumer has a concurrently pending relationships with several providers and multiple of them are available for contact with consumer, then the contact center 99 can decide on best fit, e.g., determined from the consumer's history, and offer the contacts in respective order. Additionally or alternatively, when the provider 206 logs into the website 111, the contact center 99 can prompt the provider 206 regarding whether the provider 206 wishes to talk to the consumer and/or group of consumers, e.g., multiple people trying to rent the house or who did rent the house over the last year, etc. The contact center 99 can consider multiple consumers 104 acting as group in the consumer-provider relationship.

Additionally or alternatively, an agent workstation 112 (1-n) can automatically contact the consumer 204 or provider 206, e.g., based on the intent analysis (406). The contact center 99 can also provide conversations with a determined group of consumers 204 or providers 206 in this way. If business process outsourcing (BPO) is implemented, contact center 99 resources can be shared. For example, one contact center can provide technical support in U.S., and determined interactions can be sent to an overseas contact center. Additionally or alternatively, the contact center 99 can group the consumer 204 and the provider 206 and treat the provider 206 as one entity, e.g., for purposes of processing, query resolution, etc.

Figure 5:
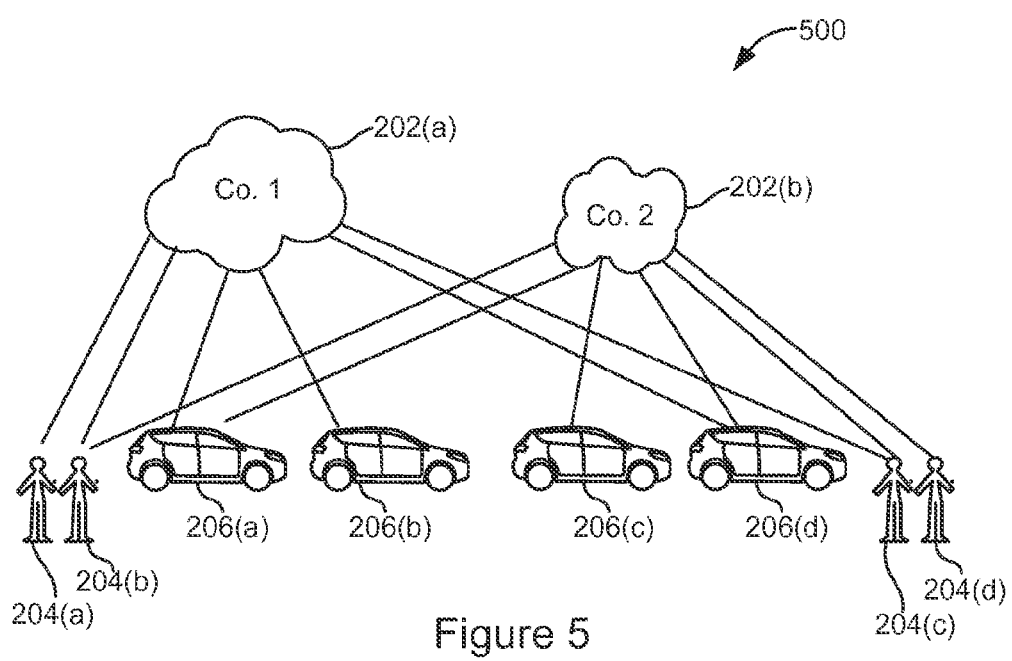
FIG. 5 is a block diagram of an example architecture in which the contact center can create a relationship between different divisions of the same business and/or between different businesses.

FIG. 5 is a block diagram of an example architecture 500 in which the contact center 99 can create a relationship between different divisions of the same business and/or between different businesses. For example purposes, company one 202(a) is a car ride service called UBER and company two 202(b) is a car ride service called LYFT. The contact center 99 can offer the best deal to the consumers 204(a-n), e.g., potential passengers, across multiple different providers 206(a-n), e.g., drivers, e.g., by monitoring the deals being offered by the different providers 206(a-n). When the passenger requests a ride, the contact center 99 can pick a marketplace 202(a) or 202(b), e.g., based on a location of the passengers and drivers, a segment of the passenger, a cost of the providers, etc. to provide service options to the passengers across multiple marketplaces and multiple providers. The server 113 can perform the analysis based on the information collected and stored in database 117 to provide the service options. Therefore, the contact center 99 can act as a mediator between the consumer 204 and the provider 205, e.g., for security purposes the provider 206 may want to be contacted without a personal phone number being exposed. The contact center 99 can also act as the mediator in addressing any problems between the consumer 204 and the provider 206, e.g., as described above.

The contact center 99 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A system for servicing a third party marketplace, the marketplace comprising a plurality of consumers and a plurality of providers, the system comprising:
   a data storage device storing a database
   a switch for routing interactions to a plurality of agent workstations servicing a contact center;
   a processor coupled to the data storage device;
   a memory coupled to the processor, wherein the memory has stored thereon instructions that, when executed by the processor, cause the processor to:
      monitor first past interactions between the plurality of consumers and the third party marketplace or the plurality of providers and the third party marketplace, wherein the plurality of providers are providers for the marketplace, wherein the plurality of consumers conduct a plurality of transactions with the plurality of providers through the marketplace, and wherein the marketplace is configured to connect the plurality of consumers with the plurality of providers;
      monitor second past interactions between the plurality of consumers and the plurality of providers, the second past interactions arising through the marketplace;
      store information based on the monitored first and second past interactions in the database stored on the data storage device, wherein the information includes information about relationships between the plurality of consumers, the plurality of providers, and the marketplace;
      detect a first request for a first new interaction from a first consumer of the plurality of consumers;
      in response to detecting the first request, identify a potential provider for the first consumer based on the first and second past interactions, the potential provider being selected from the plurality of providers;
      detect a second request for a second new interaction from a second consumer of the plurality of consumers or a first provider of the plurality of providers; and
      in response to detecting the second request, transmit a signal to the switch for routing the second new interaction to a selected agent workstation of the plurality of agent workstations, the selected agent workstation being selected from the plurality of agent workstations based on the first and second past interactions,
   wherein the marketplace is hosted on a web server outside the contact center.

2. The system of claim 1, wherein the instructions, when executed by the processor, further cause the processor to transmit a query to a device of the first consumer, wherein the query is for prompting identification of a mode of communication with the potential provider.

3. The system of claim 2, wherein the mode of communication is voice or chat.

4. The system of claim 1, wherein the instructions, when executed by the processor, further cause the processor to:
monitor presence of the plurality of providers, wherein the instructions that cause the processor to identify the potential provider further include instructions that cause the processor to identify the potential provider for the first consumer based on the presence of the provider.

5. The system of claim 1, wherein the instructions, when executed by the processor, further cause the processor to transmit a query to a device of the potential provider prior to establishing the first new interaction between the first consumer and the potential provider, wherein the query is for prompting acceptance of the first request for the first new interaction.

6. The system of claim 1, wherein the instructions, when executed by the processor, further cause the processor to:
monitor third interactions between the plurality of consumers and a second marketplace or a plurality of second providers and the second marketplace, wherein the plurality of second providers are providers for the second marketplace;
monitor fourth interactions between the plurality of consumers and the plurality of second providers, the fourth interactions arising through the second marketplace; and
store information on the monitored third and fourth interactions in the data storage device, wherein the instructions that cause the processor to identify the potential provider further include instructions that cause the processor to identify the potential provider based on the stored information on the third and fourth interactions.

7. The system of claim 6, wherein the instructions, when executed by the processor, further cause the processor to initiate the first new interaction between the first consumer and the potential provider, wherein the first new interaction may arise through the marketplace or the second marketplace.

8. The system of claim 1, wherein the instructions, when executed by the processor, further cause the processor to share analytics data related to the potential provider with the first consumer.

9. The system of claim 1, wherein the instructions, when executed by the processor, further cause the processor to:
in response to detecting the first request, identify a second potential provider for the first consumer, wherein the second potential provider is identified based on goods or services predicted to be of interest to the first consumer, wherein the prediction is based on the first request for the first new interaction.

10. A method for servicing a third party marketplace, the marketplace comprising a plurality of consumers and a plurality of providers, the method comprising:
monitoring, by a processor, first past interactions between the plurality of consumers and the third party marketplace or the plurality of providers and the third party marketplace, wherein the plurality of providers are providers for the marketplace, wherein the plurality of consumers conduct a plurality of transactions with the plurality of providers through the marketplace, and wherein the marketplace is configured to connect the plurality of consumers with the plurality of providers;
monitoring, by the processor, second past interactions between the plurality of consumers and the plurality of providers, the second past interactions arising through the marketplace;
storing, by the processor, information based on the monitored first and second past interactions in a database stored on a data storage device, wherein the information includes information about relationships between the plurality of consumers, the plurality of providers, and the marketplace;
detecting, by the processor, a first request for a first new interaction from a first consumer of the plurality of consumers;
in response to detecting the first request, identifying, by the processor, a potential provider for the first consumer based on the first and second past interactions, the potential provider being selected from the plurality of providers;
detecting, by the processor, a second request for a second new interaction from a second consumer of the plurality of consumers or a first provider of the plurality of providers, wherein a switch for routing interactions to a plurality of agent workstations servicing a contact center; and
in response to detecting the second request, transmitting, by the processor, a signal to the switch for routing the second new interaction to a selected agent workstation of the plurality of agent workstations, the selected agent workstation being selected from the plurality of agent workstations based on the first and second past interactions,
wherein the marketplace is hosted on a web server outside the contact center.

11. The method of claim 10, further comprising transmitting, by the processor, a query to a device of the first consumer, wherein the query is for prompting identification of a mode of communication with the potential provider.

12. The method of claim 11, wherein the mode of communication is voice or chat.

13. The method of claim 10, further comprising monitoring, by the processor, presence of the plurality of providers, wherein identifying the potential provider further comprises identifying the potential provider for the first consumer based on the presence of the provider.

14. The method of claim 10, further comprising transmitting, by the processor, a query to a device of the potential provider prior to establishing the first new interaction between the first consumer and the potential provider, wherein the query is for prompting acceptance of the first request for the first new interaction.

15. The method of claim 10, further comprising:
monitoring, by the processor, third interactions between the plurality of consumers and a second marketplace or a plurality of second providers and the second marketplace, wherein the plurality of second providers are providers for the second marketplace;
monitoring, by the processor, fourth interactions between the plurality of consumers and the plurality of second providers, the fourth interactions arising through the second marketplace; and
storing, by the processor, information on the monitored third and fourth interactions in the data storage device, wherein identifying the potential provider further comprises identifying the potential provider for the first consumer based on the stored information on the third and fourth interactions.

16. The method of claim 15, further comprising:
   initiating, by the processor, the first new interaction between the first consumer and the potential provider, wherein the first new interaction may arise through the marketplace or the second marketplace.

17. The method of claim 10, further comprising sharing, by the processor, analytics data related to the potential provider with the first consumer.

18. The method of claim 10, further comprising: in response to detecting the first request, identifying, by the processor, a second potential provider for the first consumer, wherein the second potential provider is identified based on goods or services predicted to be of interest to the first consumer, wherein the prediction is based on the first request for the first new interaction.

* * * * *